(12) United States Patent
Marston (10) Patent No.: US 8,937,849 B1
(45) Date of Patent: Jan. 20, 2015

(54) AUTO-FOCUS FOR CIRCULAR SYNTHETIC APERTURE SONAR

(75) Inventor: Timothy M. Marston, Panama City Beach, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 344 days.

(21) Appl. No.: 13/568,677

(22) Filed: Aug. 7, 2012

(51) Int. Cl.
*G01S 15/89* (2006.01)

(52) U.S. Cl.
USPC ............................................................ 367/88

(58) Field of Classification Search
CPC ........................................................ G01S 15/89
USPC .............................................................. 367/88
See application file for complete search history.

(56) References Cited

U.S. PATENT DOCUMENTS

| | | | | |
|---|---|---|---|---|
| 8,213,740 | B1 * | 7/2012 | Rikoski | 382/278 |
| 8,285,475 | B2 * | 10/2012 | Tan et al. | 701/300 |
| 8,326,081 | B1 * | 12/2012 | Rikoski | 382/278 |
| 8,594,457 | B1 * | 11/2013 | Richard | 382/278 |

OTHER PUBLICATIONS

Callow et al.; Circular Synthetic Aperture Sonar Without a Beacon; Jun. 2009; 8 pages.*
Callow et al.; Autofocus for Circular Synthetic Aperture Imaging; Sep. 2010; pp. 1-10.*
Marston; A correlation-based autofocus algorithm for coherent circularsynthetic aperture sonar; 2012; pp. 66-69.*

* cited by examiner

*Primary Examiner* — Daniel Pihulic
(74) *Attorney, Agent, or Firm* — James T. Shepherd (57) ABSTRACT

A method of focusing fully-coherent circular synthetic aperture sonar (CSAS) imagery is provided. A k-space representation of the CSAS image is generated using the two dimensional Fast-Fourier Transform (FFT). Sub-aperture images are generated by windowing the k-space representation and applying the two dimensional inverse FFT to the windowed spectrum. All adjacent complex sub-aperture images are correlated, the correlation peaks are detected and the relative shifts in X and Y as a function of look-angle are recorded. The relative shifts between adjacent sub-apertures are integrated and the means are subtracted to find the absolute shift as a function of look-angle. A motion-solution is calculated by exploiting the relationship between apparent scene shift and actual vehicle sway. The motion estimation is used to generate a phase-correction matrix that is multiplied by the k-space representation of the fully-coherent image.

20 Claims, 3 Drawing Sheets

AUTO-FOCUS FOR CIRCULAR SYNTHETIC APERTURE SONAR

STATEMENT OF GOVERNMENT INTEREST

The invention described herein may be manufactured and used by or for the Government of the United States of America for governmental purposes without the payment of any royalties.

BACKGROUND OF THE INVENTION (1) Field of the Invention

The present invention relates to circular synthetic aperture sonar. More particularly, the present invention relates to a method of focusing fully-coherent circular synthetic aperture imagery without the aid of a navigation beacon.

(2) Description of the Prior Art

Circular synthetic aperture sonar (CSAS) is a specific modality of synthetic aperture sonar in which individual pings from a sonar device having a circular trajectory are coherently processed to generate an image having a full 360° of backscattered aspect information. In contrast, "linear-scan" synthetic aperture sonar coherently processes backscattered echoes from a narrow range of aspects, typically in the low tens of degrees, to generate an image.

Circular synthetic aperture sonar images are useful because of the large amount of information recovered for a particular scene, and echoes backscattered from all aspects can be used to generate target outlines and high resolution imagery. While theoretically very useful, focused CSAS images are difficult to obtain due to motion constraints. A major source of defocusing in CSAS imagery are deviations of the sonar platform from a circular trajectory, such as caused by wave action, path tracking errors and the like.

As noted, a CSAS image is an image generated using the entire set of backscattered echoes gathered from a platform moving around a circular aperture. Sub-aperture (SA) images, which are distinct from CSAS images, can be generated using any limited portion of the circular aperture (e.g., an image can be made using the set of look angles spanning from 30° to 50°). Sway error, which is unique for individual sub-apertures, tends to cause the scene to shift as a function of look-angle.

One auto-focus method known in the art works by generating multiple SA intensity images, typically numbering in the low tens. The algorithm attempts to optimally shift and sum these images to counteract for the scene shift caused by platform motion. To do this, each of these SA images is correlated with the others, an operation requiring $N*(N-1)/2$ image correlations.

The relative locations of the correlation peaks in the X and Y coordinates of the sub-aperture image and the signal-to-noise values gathered from the correlation peaks are used to generate a robust least-squares polynomial expression for the scene shift. The resulting polynomial is used to estimate the optimal scene shift that can be applied to each sub-aperture to align them all before summing.

While the algorithm appears to be fairly robust, there are two major drawbacks to this method. First, it is a non-iterative algorithm that provides no motion solution. The relationship between the scene shift and the actual platform motion in a CSAS scenario is essential for making a navigational correction which could potentially result in a fully-coherent, high-resolution CSAS image. However, the relationship is not obvious and has not been outlined in the literature.

The second drawback to the multiple SA method is that the order of the polynomial expression is often much too small to accurately model the platform motion. A fundamental assumption in the outlined algorithm is that the motion error within any of the sub-apertures can be approximated as negligible.

Because of the large number or correlations that must occur relative to the actual number of apertures utilized, $(N*(N-1)/2$, N=number of sub-apertures), and the tendency for coefficients of the polynomial solution to quickly exceed machine precision, the number of sub-apertures remains limited in order. One published example of the multiple SA method uses thirty (N=30) sub-apertures (H. J. Callow, R. E. Hanson, S. Synnes, and T. O. Saebo, "Circular synthetic aperture sonar without a beacon," Proceedings of the $3^{rd}$ International Conference & Exhibition on Underwater Acoustic Measurements, June 2009). For many synthetic aperture sonar parameters and environments, this limited number of sub-apertures remains insufficient to accurately model platform motion.

A second auto-focus method known in the art uses a maximum a-posteriori (MAP) estimator to attempt to simultaneously focus a CSAS image and determine scene bathymetry, decoupling scene elevation from platform motion (H. J. Callow, S. Synnes, T. O. Saebo, R. E. Hanson "Autofocus for circular synthetic aperture imaging," Proceedings of Synthetic Aperture Sonar and Synthetic Aperture Radar (SAS/SAR) 2010, Lerici, Italy, September 2010). While the concepts in this approach are directly applicable to CSAS, the data sets used in the published example of this method were obtained from four looks along the cardinal directions at the same scene using four independent line-scans rather than a circular path trajectory.

As described in the literature, the approach offers no method for recovering a platform motion estimate. Accordingly, the efficacy of this approach in the context of an actual CSAS scenario, in which a platform undergoes rapid motion error, remains to be demonstrated.

Methods used in circular synthetic aperture radar (CSAR) may be adapted to CSAS. While most examples of CSAR use error-free data recorded from a fixed source and rotating platform, there are known in the art examples of CSAR imagery recorded from an aircraft rather than a fixed system. Some of these examples mention Phase Gradient Autofocus/Phase Curvature Autofocus based focusing methods.

The draw-back of these methods is that they require prominent points with uniform angular response. In the examples known in the art, the prominent points were provided by artificially placing bright, point-like targets in the scene before imaging took place. These methods also assume a-priori that the blurring of the targets is small enough that they remain distinct from adjacent scatterers. Such assumptions do not hold well in many CSAS imaging scenarios.

Another auto-focus method pertaining to CSAR is a correlation based map-drift algorithm similar to the multiple SA method described previously. This CSAR method operates by forming a large number of small apertures. The image shifts are found by correlating each sub-aperture with the accumulated sum of the aligned versions of all previous apertures, starting with the first look angle.

This saves considerable time from a correlation standpoint. However, to calculate the associated trajectory, a set of linear equations relating each apparent location to all other locations is established and singular-value-decomposition (SVD) is used to solve for the navigation correction. This method applies the navigation correction to the raw data which is then re-beamformed. The algorithm used in the method can be iterated.

While this method has a speed advantage with respect to the multiple SA method described previously, the navigation solution must be applied to the raw data, requiring multiple iterated instances of beamforming, reducing computational efficiency. Furthermore, this method of sub-aperture scene tracking lacks a direct measurement of phase curvature error, resulting in sub-optimal precision for high frequency error estimation.

Thus, a need has been recognized in the state of the art to provide a method of focusing fully-coherent circular synthetic aperture imagery without the aid of a navigation beacon. The method needs to be iterative in order to accurately model platform motion. The method should be applicable without the need to use prominent points within the field that have uniform angular response. Further, the method should be computationally efficient without requiring re-beamforming.

SUMMARY OF THE INVENTION

It is therefore a general purpose and primary object of the present invention to provide a method of focusing fully-coherent circular synthetic aperture imagery. A fully complex CSAS image is first generated using raw echo data that has uncompensated motion errors. A k-space representation of the image is generated using the two dimensional Fast-Fourier Transform (FFT).

Sub-aperture images are then generated and all adjacent complex sub-aperture images are correlated and the correlation peaks are detected. In order to generate the sub-aperture images, the k-space representation of the image is windowed and the two dimensional inverse FFT (iFFT) is applied to the windowed spectrum.

The relative shifts in X and Y as a function of look-angle are recorded and the relative shifts between adjacent sub-apertures in X and Y are integrated. The means are subtracted to find the absolute shift in X and Y of the scene as a function of look-angle.

A motion-solution is calculated by exploiting the relationship between apparent scene shift and actual vehicle sway, where sway is defined as motion of the platform normal to the circular path used for motion compensation. The motion estimation is used to generate a phase-correction matrix that is multiplied by the k-space representation of the fully-coherent image. The process is iterated if necessary.

In one embodiment, a method of focusing a circular synthetic aperture sonar image of a scene taken from a platform includes generating a k-space representation of the sonar image, generating sub-aperture images based on windowing the k-space representation over chosen look-angles and correlating adjacent ones of the sub-aperture images. The method also includes detecting correlation peaks based on the correlations and obtaining absolute shifts of the scene as a function of the look-angles. The absolute shifts are based on the correlation peaks. The method additionally includes calculating a sway motion estimation of the platform based on the absolute shifts, generating a phase-correction matrix based on the sway motion estimation and applying the phase-correction matrix to the sonar image to recover a focused image of the scene.

In one embodiment the method further includes iteratively returning to generating sub-aperture images utilizing a k-space representation of the focused image. The step of generating sub-aperture images further includes applying an inverse Fast Fourier Transform to each windowed k-space representation.

In one embodiment, the method first includes generating the sonar image using a phase-preserving method applied to the raw echo data of the scene that can have uncompensated motion errors. Various phase-preserving methods can be used including projection-slice imaging and time-delay and sum imaging.

In one embodiment, the step of detecting correlation peaks further includes interpolating and filtering correlated sub-aperture images. The step of obtaining absolute shifts can include expressing the correlation peaks as a function of the look angles so as to obtain relative shifts. The mean can be subtracted from the relative shifts and the relative shifts accumulated.

In one embodiment, the step of calculating a sway motion estimation can include calculating axial scene shifts based on the absolute shifts and integrating and scaling the axial scene shifts to obtain a scalar function $A(\theta)$, wherein platform sway is proportional to $A(\theta)$ and wherein $\theta$ corresponds to an angle in the spatial coordinates X and Y of the scene. The scalar function is obtained from the expression:

$$A(\theta_n) = C\left[\sum_{n=1}^{N} \frac{\sqrt{X_n^2 + Y_n^2} * \cos\left(\theta_n + \arctan\left(\frac{Y_n}{X_n}\right)\right)}{N} + 2\sum_{1}^{n} \frac{\sqrt{X_n^2 + Y_n^2} * \sin\left(\theta_n + \arctan\left(\frac{Y_n}{X_n}\right)\right)}{\csc\left(\frac{\Delta\theta}{2}\right)}\right],$$

wherein C is a constant.

The phase-correction matrix is obtained by evaluating a polar phase function $S(|k|,\theta) = e^{j*A(\theta)|k|}$, wherein $|k|$ is a Pythagorean sum of $k_x$ and $k_y$, which are coordinates in the k-space. The step of applying the phase-correction matrix can include multiplying the k-space representation by a conjugate of the polar phase function to obtain the k-space representation of the focused image and taking an inverse spatial Fourier transform of the k-space representation of the focused image.

In one embodiment, a method of focusing a circular synthetic aperture sonar image of a scene taken from a platform includes the step of generating the sonar image using a phase-preserving method applied to the raw echo data of the scene, which can have uncompensated motion errors. Further steps include generating a k-space representation of the sonar image, generating reference sub-aperture images from a number, M, of evenly spaced look-angles over $2\pi$ and generating relative sub-aperture images from a number, N, of evenly spaced look-angles, wherein N>>M.

Additionally, the method includes correlating a set of the relative sub-aperture images located between ± a span angle of a look angle corresponding to a particular one of the reference sub-aperture images with the particular reference sub-aperture image, detecting correlation peaks and shifting the set of relative images based on the correlation peaks to form a semi-coherent image representing the scene from look-angles corresponding to ± the span angle. The semi-coherent image is centered on the look angle corresponding to the particular reference sub-aperture image. Also, the method includes iteratively performing the steps of correlating, detecting and shifting for each of the reference sub-aperture images.

The method further includes determining a polynomial expression relating locations of the semi-coherent images with each other based on multiple-aperture map-drift methodology. Based on the polynomial expression, peak-shift measurements made between the relative sub-aperture images and the reference sub-aperture images are positioned to obtain absolute shifts. A sway motion estimation of the platform is calculated based on the absolute shifts, a phase-correction matrix is generated based on the sway motion estimation and the phase-correction matrix is applied to the sonar image to recover a focused image of the scene.

In one embodiment, the method includes iteratively returning to generating reference sub-aperture images utilizing a k-space representation of the focused image. In one embodiment, the step of calculating a sway motion estimation includes calculating axial scene shifts based on the absolute shifts and integrating and scaling the axial scene shifts to obtain a scalar function $A(\theta)$, wherein platform sway is proportional to $A(\theta)$ and wherein $\theta$ corresponds to an angle in spatial coordinates X and Y of the scene.

The scalar function is obtained from the expression:

$$A(\theta_n) = C\left[\sum_{i=1}^{N} \frac{\sqrt{X_i^2 + Y_i^2} * \cos\left(\theta_i + \arctan\left(\frac{Y_i}{X_i}\right)\right)}{N} + 2\sum_{i=1}^{n} \frac{\sqrt{X_i^2 + Y_i^2} * \sin\left(\theta_i + \arctan\left(\frac{Y_i}{X_i}\right)\right)}{\csc\left(\frac{\Delta\theta}{2}\right)}\right],$$

wherein C is a constant. The step of generating a phase-correction matrix can include evaluating a polar phase function $S(|k|,\theta) = e^{j*A(\theta)|k|}$, wherein $|k|$ is a Pythagorean sum of $k_x$ and $k_y$, which are coordinates in the k-space.

In one embodiment, the span angle is $\pi/M$. In one embodiment, the span angle is greater than $\pi/M$, such that the semi-coherent images overlap. In this case, the overlapping shift solutions are differentiated, averaged and re-integrated to form a continuous solution of semi-coherent images. In one embodiment, the phase-preserving methods can include projection-slice imaging and time-delay and sum imaging. In one embodiment, the step of detecting correlation peaks can include interpolating and filtering the correlated sub-aperture images.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DESCRIPTION OF THE INVENTION

Circular Synthetic Aperture Sonar (CSAS) utilizes the backscattered echoes from sonar mounted on a platform moving in a circular trajectory around a scene. Deviations of the sonar platform from a circular trajectory are a major source of defocusing in CSAS imagery. If the platform motion and its deviation from a circular trajectory are known, these errors can be corrected by appropriately time-shifting the raw back-scattered echo data before image reconstruction.

While a CSAS image makes use of the back-scattered data from the entire aperture, the processing used to generate a CSAS image can be applied to a limited portion of the circular aperture to generate a "sub-aperture" (SA) image. Because the aperture sizes of SA images tend to be much smaller than the total circular aperture, traditional motion-compensation techniques used by the sonar community for linear synthetic aperture scenarios can be reformulated and applied to retain reasonable focus of these smaller SA images.

The residual, uncompensated error appears as a relative scene shift in both X and Y (the coordinates of the imaging plane) between SA images. These absolute shifts in X and Y can be used to calculate a motion estimation for the platform which may be applied directly to the beamfomed image in k-space, (the two-dimensional Fourier transform of the image, also referred to herein as spectrum).

To successfully perform this operation requires that the estimation of the platform motion be adequately sampled. In shallow water scenarios the platform tends to deviate from the circular path in a rapid manner, requiring a large number of samples to be utilized for accurate motion estimation. Because a real, truncated signal has infinite bandwidth, low-pass filtering is applied to the estimation before measuring, and this is accomplished by slightly overlapping the boundaries of the SA windows.

Figure 1:
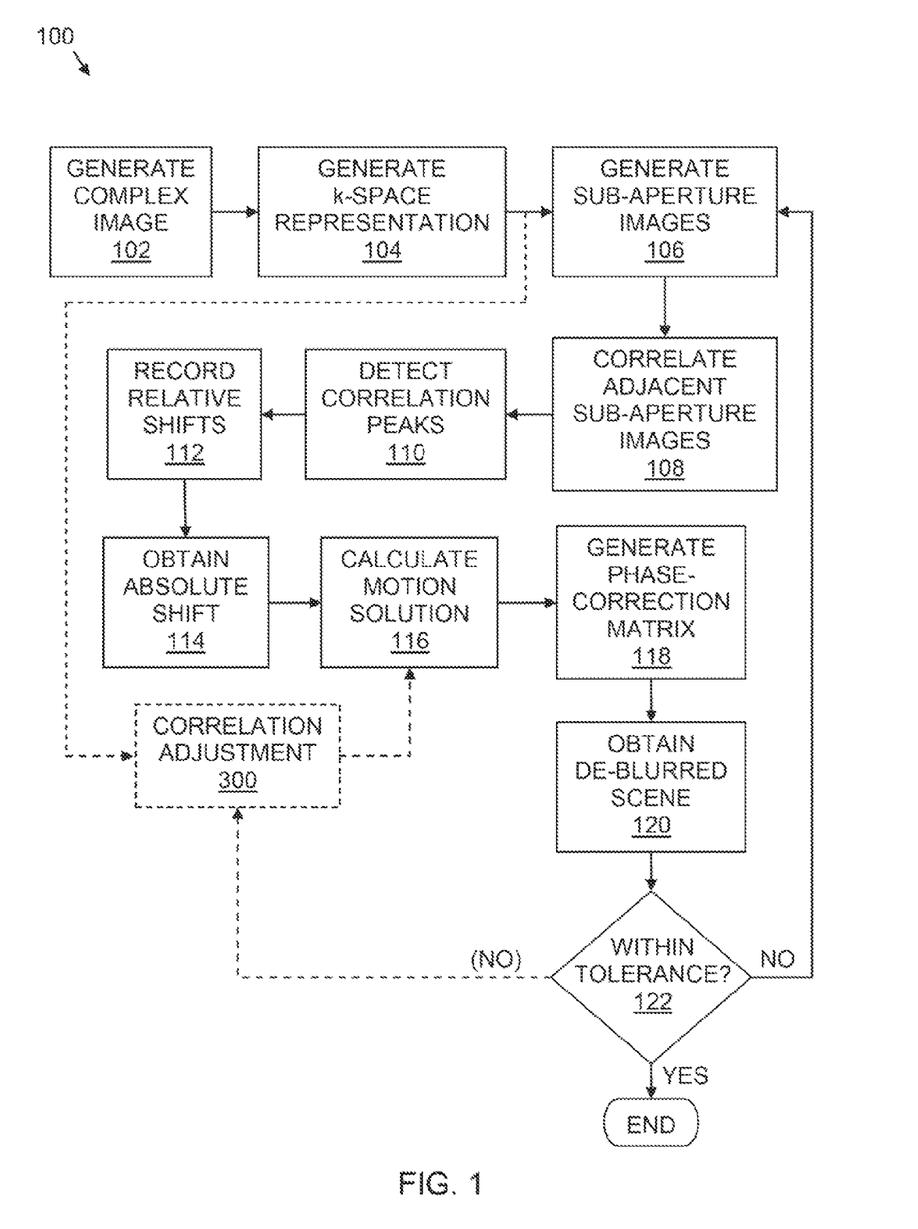
FIG. 1 illustrates a block diagram of a method for focusing a CSAS image.

Referring now to FIG. 1, there is shown a block diagram of method 100 for focusing a CSAS image as previously described in a general manner hereinbefore. At block 102, a fully complex CSAS image is generated using raw echo data that has uncompensated motion errors. Block 102 utilizes a phase-preserving method for forming the image.

As is known in the art, many different methods are available for forming an image using raw echo data. By using a phase-preserving method, the result of block 102 is a well-sampled image that has an un-aliased k-space spectrum. As known examples to those of skill in the art, but not for limitation, fully-coherent, phase preserving methods for image reconstruction can include projection-slice imaging and time-delay and sum imaging.

As is known to those of skill in the art, an image reconstructed using a phase-preserving method can be represented in wavenumber (k) space by taking the Fourier Transform in the spatial dimensions (X and Y) of the scene. The limited bandwidth of a sonar system often results in a spectral annulus when viewed in k-space. At block 104, a k-space representation of the image is generated using the two dimensional Fast-Fourier Transform (FFT).

At block 106, N sub-aperture (SA) images are generated by applying a two dimensional inverse FFT (iFFT) to windowed portions of the full circular aperture and spectrum. The number N can be chosen to balance the convergence of method 100 against the computational intensity of method 100, as will be explained in further detail hereinafter.

Figure 2:
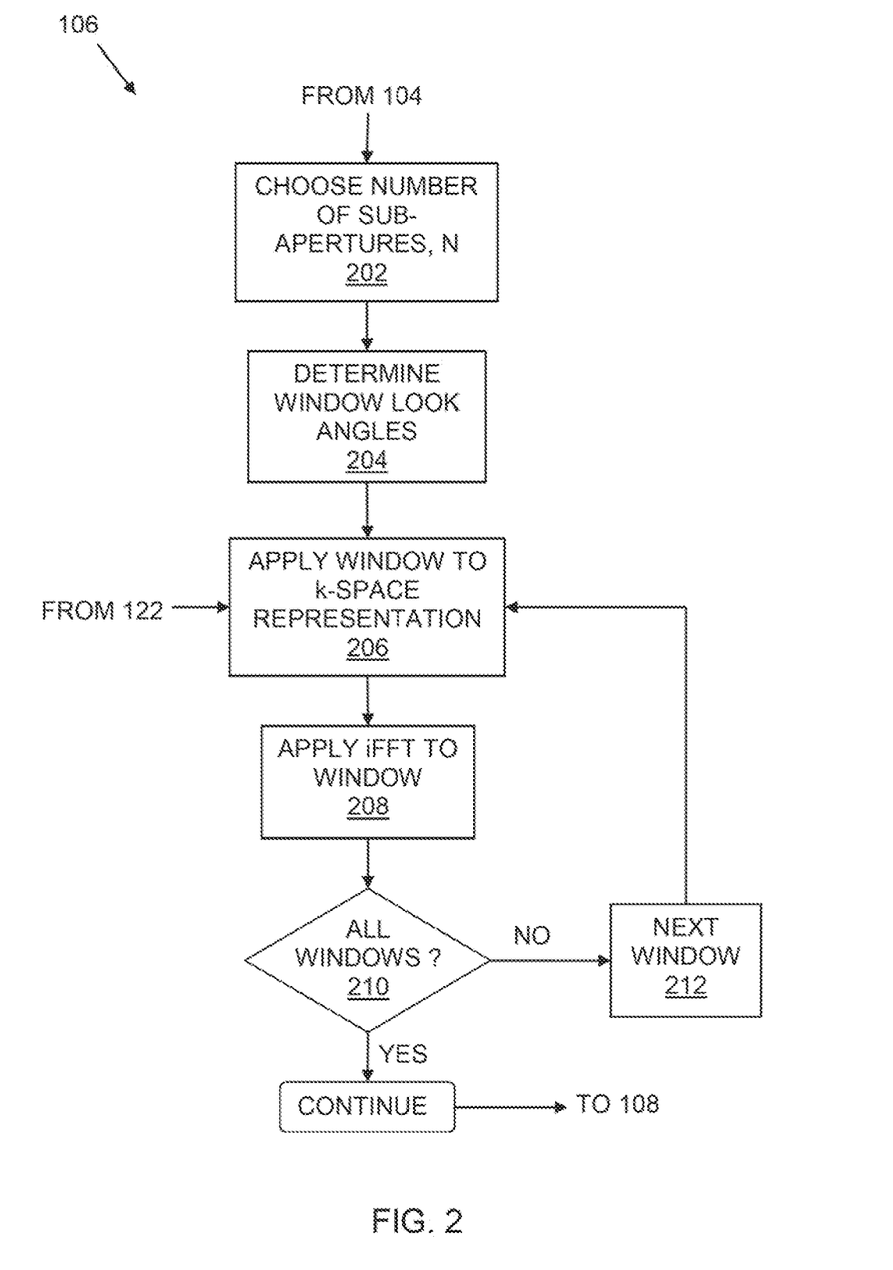
FIG. 2 illustrates a detailed block diagram of a method for generating sub-aperture images.

Referring now to FIG. 2, there is shown a detailed block diagram of step 106 for generating the SA images. To start, the number N is chosen at block 202 and the window look angles, $\theta_n$, for the SA images are determined (block 204) from $\theta_n = 2\pi/N$, $n=1,N$. At block 206, a window preserving the spectral information spanning look angle $\theta_n$ to look angle $\theta_{n+1}$ is applied to the k-space representation of the image.

The iFFT is applied to the windowed data to recover the SA image in spatial coordinates (block 208). The absolute value of this complex SA image is used to generate an intensity image, in the manner known to those of skill in the art. If the full circular aperture and spectrum has not been windowed, i.e., the number of windows is less than N, as determined at block 210, the window is incremented to the next look angle (e.g., spanning $\theta_{n+1}$ to $\theta_{n+2}$) at block 212. When the full circular aperture and spectrum has been windowed (block 210), method 100 continues, as indicated at block 214.

Referring back to FIG. 1, once the N SA images are generated at block 106 (representing look angles from 0 to $(2\pi-2\pi/N)$ radians), adjacent complex SA images are correlated (block 108). N correlations are computed between SA images representing adjacent look angles. For example, if $SA_1$, $SA_2, \ldots, SA_n$ represent sub-aperture images at look angles $0*(2\pi/N)$, $1*(2\pi/N), \ldots, (N-1)*(2\pi/N)$, then $SA$, is correlated with $SA_1$, and $SA_3$ is correlated with $SA_2$, etc.

The results of the correlations between image pairs are two dimensional functions with peaks at $(P_{nx}, P_{ny})$, where $P_{nx}$ and $P_{ny}$ represent the relative shift in X and Y between the image pairs. The relative shifts can be expressed as a function of the average look-angle between image pairs. At block 110, the correlation peaks $(P_{nx}, P_{ny})$ are detected for each image pair, providing the relative shift between each image pair. Interpolation and filtering can be used to obtain more accurate estimates of $P_{nx}$ and $P_{ny}$. At block 112, the relative shifts in X and Y as a function of look-angle are recorded.

The relative shifts obtained at block 110 are measurements of the differential movement of the scene shift as a function of look-angle. Since the circular aperture is closed (i.e. the beginning and ending points of the circular path are the same), the absolute shifts are constrained to be zero-mean. To obtain the absolute shifts of the scene in X and Y, as at block 114, the relative shifts recorded at block 112 have the mean subtracted and are accumulated. By having the mean subtracted before accumulation, linear offsets from noise and/or discretization errors can be avoided.

At block 116, a motion-solution is calculated by exploiting the relationship between apparent scene shift and actual vehicle sway, where sway is defined as motion of the platform normal to the circular path. This relationship can be derived by supposing an image is corrupted by sway errors resulting in blurred image $L_b(X,Y)$, approximated to have the spectrum:

$$F\{L_b(X,Y)\} = L_b(k_x,k_y) = L(k_x,k_y)*S, \quad [1]$$

where F is the two-dimensional Fourier transform operator, $L(k_x,k_y)$ is the spatial spectrum of the uncorrupted image $L(X,Y)$ and S is a function determined by the sway error induced by platform motion.

The function S is a polar phase function modeled by $$S(|k|,\theta) = e^{j*A(\theta)|k|}, \quad [2]$$

where $\theta$ is the arctangent of $(k_x/k_y)$, $|k|$ is the Pythagorean sum of $k_x$ and $k_y$, and $A(\theta)$ is a scalar function of $\theta$. Consider a patch $M_n$ in $L_b$, defined to be the region between $$\theta_n - \frac{\Delta\theta}{2}$$

and $$\theta_n + \frac{\Delta\theta}{2},$$

where $\Delta\theta$ is the spacing between adjacent sub-apertures, and is small enough that the variation of the phase of $S(\theta)$ over $M_n$ is slow and can be approximated by a plane $P_n$ determined by the rays $$A\left(\theta_n - \frac{\Delta\theta}{2}\right)|k|$$

and $$A\left(\theta_n + \frac{\Delta\theta}{2}\right)|k|,$$

for $0 \leq |k| < \infty$.

The inverse spatial Fourier transform of patch $M_n$ is a sub-aperture image $M(SA)_n$ formed from the pings located between $$\theta_n - \frac{\Delta\theta}{2}$$

and $$\theta_n + \frac{\Delta\theta}{2}$$

on the circular aperture. According to the Fourier shift theorem, $M(SA)_n$ will have a shift in X and Y proportional to, and defined by, the slopes of $P_n$ in the $k_x$ and $k_y$ directions.

In k space, an angle $\theta = \arctan(k_y/k_x)$ is equivalent in spatial coordinates to $\theta = \arctan(Y/X)$. The shifts $X_n$ and $Y_n$ experienced by $M(SA)_n$ may be redefined in terms of a radial shift in the direction $\theta_n$, the mean angle of the rays bounding patch $M(SA)_n$ and an axial shift in the direction $\theta_n - \pi/2$. The scalar value $A(\theta_n)$ may be directly computed from a measurement of the radial shift in X and Y coordinates, which from simple geometry is found to be:

$$H_{radial} = \sqrt{X_n^2 + Y_n^2} * \cos\left(\theta_n - \arctan\left(\frac{Y_n}{X_n}\right)\right). \quad [3]$$

Likewise, the axial shift is found to be:

$$H_{axial} = \sqrt{X_n^2 + Y_n^2} * \sin\left(\theta_n - \arctan\left(\frac{Y_n}{X_n}\right)\right). \quad [4]$$

Practical implementation of the correlation operations results in shift measurements having a large amount of digitization error in the radial direction. More useful is an indirect computation of $A(\theta_n)$ by first measuring the axial shift and exploiting the relationship between the axial and radial shift. Recalling that patch $M_n$ is defined by two bounding rays, the shift in the axial direction is determined by the slope of plane $P_n$ in the axial direction:

$$H_{axial} \propto \frac{A\left(\theta_n + \frac{\Delta\theta}{2}\right)|k| - A\left(\theta_n - \frac{\Delta\theta}{2}\right)|k|}{2|k|\sin\left(\frac{\Delta\theta}{2}\right)},$$

or $$H_{axial} \propto \frac{\Delta A_n}{2\sin\left(\frac{\Delta\theta}{2}\right)}.$$

The axial shift of sub-aperture scene $M(SA)_n$ at angle $\theta_n$ is therefore related to the change in slope $\Delta A_n$ by the scalar $$1 / \left(2\sin\left(\frac{\Delta\theta}{2}\right)\right).$$

The function $A(\theta)$ can be calculated from measurements of the absolute scene shift using the following expression:

$$A(\theta_n) = C\left[\sum_{n=1}^{N} \frac{\sqrt{X_n^2 + Y_n^2} * \cos\left(\theta_n + \arctan\left(\frac{Y_n}{X_n}\right)\right)}{N} + 2\sum_{l}^{n} \frac{\sqrt{X_n^2 + Y_n^2} * \sin\left(\theta_n + \arctan\left(\frac{Y_n}{X_n}\right)\right)}{\csc\left(\frac{\Delta\theta}{2}\right)}\right], \quad [6]$$

where C is a constant determined by the spatial sample-rate of the image scene.

The integration constant, lost by the axial measurement, is recovered by using the mean of the solution found using the radial measurements. Equation [6] can be interpreted as meaning that the axial scene shift at any given angle is directly related to the derivative of the sway function, and the sway function can be recovered (to within a constant) by integrating and scaling the axial scene shift.

Furthermore, the factor $$1 / \left(2\sin\left(\frac{\Delta\theta}{2}\right)\right)$$

tends to be very large because $\Delta\theta$ must be small for the linear approximation of $A(\theta)$ over $\Delta\theta$ to hold. This implies that the axial shift resulting from a change in radial shift is much larger than the radial shift itself, and therefore a more robust variable for calculating the sway function $S(\theta)$.

The motion estimation is used to generate a phase-correction matrix (block 118), which is multiplied by the k-space representation of the fully-coherent image. As calculated at block 116, the vehicle sway is proportional to the scalar function $A(\theta)$, where $\theta$ corresponds to angle in k-space, angle in the spatial coordinates of the scene and the angles of the circular aperture. The corrupting effects of the sway on the spectrum of the complex scene are approximated by Equation [1].

$A(\theta)$ was found in block 116 using the sub-aperture scene shifts in the axial direction. $S(\theta)$ is calculated from $A(\theta)$ using the relationship identified in Equation [2] for all values of $k_x$ and $k_y$. At block 120, the blurring effect of $S(\theta)$ is removed by multiplying $L_b$ by the conjugate of $S(\theta)$:

$$L(k_x,k_y)=L(k_x,k_y)S(\theta)S^*(\theta)=L_b(k_x,k_y)S^*(\theta) \quad [7]$$

The de-blurred scene is recovered by taking the inverse spatial Fourier transform:

$$L(X,Y)=F^{-1}\{L_b(k_x,k_y)S^*(\theta)\} \quad [8]$$

As indicated at block 122, the process can be repeated an arbitrary number of times, based on a chosen tolerance. For each iteration, method 100 returns to block 106 to generate the sub-aperture images based on windowing the k-space representation of the image, $L(k_x,k_y)$, as determined from Equation [7].

What has thus been described is an auto-focus method, method 100, for fully-coherent CSAS imagery generated using raw echo data that has uncompensated motion errors (102). A k-space representation of the CSAS image is generated using the two dimensional Fast-Fourier Transform (104). Sub-aperture images are generated by windowing the k-space representation and applying the two dimensional inverse FFT to the windowed spectrum (106).

All adjacent complex sub-aperture images are correlated (108) and the correlation peaks are detected (110). The relative shifts in X and Y as a function of look-angle are then recorded (112). The relative shifts between adjacent sub-apertures are integrated and the means are subtracted to find the absolute shift as a function of look-angle (114).

A motion-solution is calculated (116) by exploiting the relationship between apparent scene shift and actual vehicle sway. The motion estimation is used to generate a phase-correction matrix (118) that is multiplied by the k-space representation of the fully-coherent image (120). The process is iterated as necessary to obtain a chosen tolerance.

A major advantage of the described technique is that an actual, well-sampled estimation for platform motion is derived from X and Y shift coordinates. Previous auto-focusing methods did not obtain this estimation or the estimation was done in a very slow and computationally intensive manner. In contrast, the present method is nearly instantaneous. This allows for algorithm iteration and the generation of focused, fully coherent CSAS imagery in a very efficient manner.

Further in comparison with present methods, method 100 omits a polynomial descriptor for the scene shift and reduces the number of correlation operations. This allows for the number of sub-aperture images to be increased by over an order of magnitude as compared to the previous methods, without increasing the computational burden of the auto-focus operation. Additionally, the generation of sub-aperture windows using k-space windowing rather than by directly beam forming limited portions of raw data alleviates a large portion of the computational burden.

When compared to auto-focus methods described by the radar community, method 100 shows greater robustness to scene type. As described previously, point-based focusing methods used by the SAR community assume the presence of point-like scatterers that have a uniform scattering response as a function of angle. Such targets may or may not be present in a real scenario. If they are, they may not be bright enough, or their responses may not be defined well enough to separate them from surrounding clutter and use them to derive a motion solution.

Method 100 does not require the presence of point-like scatterers in the scene. Rather, method 100 assumes that the correlation between adjacent sub-apertures is high enough to result in a well-defined correlation peak. Such an assumption holds for most realistic CSAS imaging scenarios.

Further, method 100 has a number of advantages over the previously described drift based method used by the SAR community. Method 100 uses a simpler process for finding the absolute X and Y shift values and uses a simpler and orders-of-magnitude faster process for calculating the navigation solution. This allows a navigation solution to be computed from potentially an arbitrary number of sub-apertures with negligible variation in computation time.

Also, method 100 includes the means by which the navigation solution can be applied directly to the beamformed image in k-space so that the image can be focused. Additionally, method 100 provides for iteration without requiring the data to be re-beamformed.

Obviously many modifications and variations of the present invention may become apparent in light of the above teachings. For example, method 100 can be modified to be more robust to errors that correlation-based methods are prone to. In realistic situations, for example, adjacent sub-aperture images may de-correlate due to the presence of biologics, such as large clouds of fish. Also, adjacent sub-aperture images may de-correlate due to excessive motion like roll. With excessive roll motion, the beam may be steered completely away from the ocean bottom resulting in no appreciable back-scattered signal.

Figure 3:
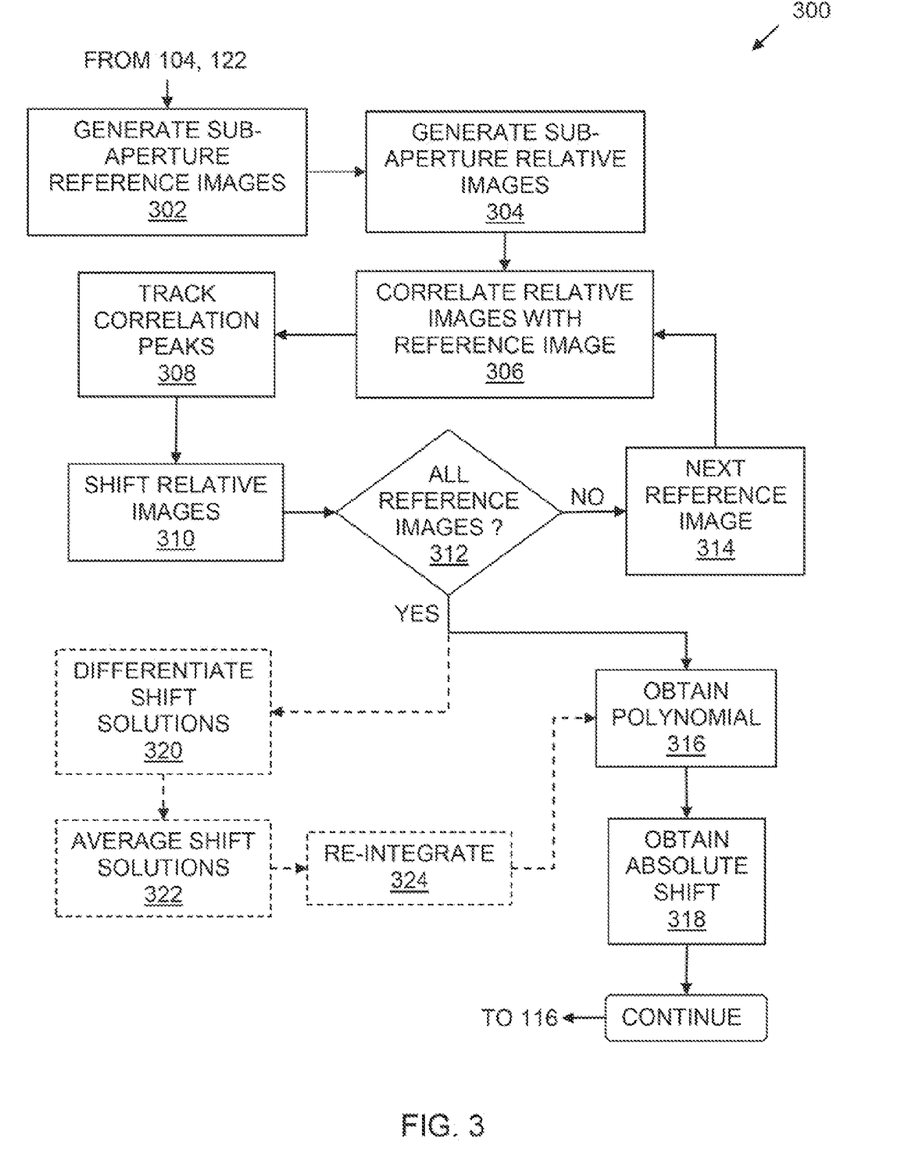
FIG. 3 illustrates a block diagram of an alternative method for generating motion error estimates.

As illustrated in phantom in FIG. 1, block 300 provides an alternative method for generating sub-aperture images and obtaining absolute coordinate shifts, i.e., an alternative method for steps 106 through 114 of FIG. 1. Referring now to FIG. 3, there is shown a block diagram of alternative method 300 for generating well-sampled motion error estimates in the event that particular sub-apertures do not correlate well.

Method 300 begins by selecting a small number M (e.g., M=10) of evenly spaced look-angles over 2π and generating narrow sub-aperture images from these look-angles (block 302), referred to as reference images for purposes of method 300. At block 304, a large number N of evenly spaced look-angles (e.g. N=360) are selected and sub-aperture images are generated for these look-angles, referred to as relative images for purposes of method 300.

All relative images located between −π/M and π/M of the look angle (referred to as a cell) corresponding to a particular reference image are correlated with the reference image (block 306) and the correlation peaks are tracked (block 308). At block 310, the locations of the correlation peaks are used to shift the relative images in the cell to form a semi-coherent image representing the scene from look-angles −π/M to π/M, centered on the look angle of that particular reference image. The process is repeated for all M reference images, as indicated at blocks 312, 314 and returning to block 306.

If relative image correlations have been performed for all M reference images, as determined at block 312, a weighted, robust, polynomial expression relating the locations of the M semi-coherent images with each other is found using the known multiple-aperture map-drift method (block 316). At block 318, the polynomial from block 316 is used to appropriately position the M sets of peak-shift measurements made between the relative and reference images.

Method 300 returns to block 116 (FIG. 1) to obtain the sway correction estimate based on the absolute shifts found at block 318. As is the case with method 100, method 300 can be iterated to refine the de-blurred scene, as indicated in phantom in FIG. 1 between block 122 and block 300. However, if the use of method 300 results in well-correlated sub-aperture images, further iterations can be performed by returning to block 206, as described previously with respect to FIGS. 1 and 2.

The use of method 300 eliminates the errors that may propagate through the solution when relative shifts between adjacent sub-apertures are integrated to find the absolute shifts. The error is eliminated by skipping the integration process all-together and directly arriving at an estimation for the absolute shift in X and Y. Unlike previously described correlation based methods that take advantage of robust multiple-aperture-map drift auto-focusing techniques, however, method 300 still results in a motion estimation that is orders of magnitude higher than that allowable by the previously described methods, and can do so with fewer correlation operations.

Increased robustness can also be found by modifying block 306 so as to contain overlap between cells. As shown in phantom in FIG. 3, the X and Y shift solutions obtained at block 310 for the overlapping cells can be differentiated (block 320). The overlapping solutions can be averaged and then re-integrated (at blocks 322 and 324, respectively) to form a continuous solution.

Still further variants of the methods described herein can use correlations between sub-aperture height-maps obtained from interferometric sensors rather than using intensity images. Also, the robustness of the integration operation through noisy aperture segments can be increased using known optimal adaptive filters such as Kalman filters. Such variants can provide realistic estimations of the platform location in such low correlation regions.

It will be understood that many additional changes in details, steps and arrangements thereof, which have been described herein and illustrated in order to explain the nature of the invention, may be made by those skilled in the art within the principle and scope of the invention as expressed in the appended claims.

What is claimed is:

1. A method of focusing a circular synthetic aperture sonar image of a scene taken from a platform, said method comprising the steps of:
   generating a k-space representation of said sonar image;
   generating sub-aperture images based on windowing said k-space representation over chosen look-angles;
   correlating adjacent ones of said sub-aperture images;
   detecting correlation peaks based on said correlating;
   obtaining absolute shifts of said scene as a function of said look-angles, said absolute shifts based on said correlation peaks;
   calculating a sway motion estimation of said platform based on said absolute shifts;
   generating a phase-correction matrix based on said sway motion estimation; and
   applying said phase-correction matrix to said sonar image to recover a focused image of said scene.

2. The method of claim 1, further comprising iteratively returning to generating sub-aperture images utilizing a k-space representation of said focused image.

3. The method of claim 2, wherein said step of generating sub-aperture images further comprises applying an inverse Fast Fourier Transform to each windowed k-space representation.

4. The method of claim 2, comprising first generating said sonar image using a phase-preserving method applied to raw echo data of said scene, said raw echo data having uncompensated motion errors.

5. The method of claim 4, wherein said phase-preserving method comprises at least one of projection-slice imaging and time-delay and sum imaging.

6. The method of claim 2, wherein said step of detecting correlation peaks further comprises interpolating and filtering correlated sub-aperture images.

7. The method of claim 6, wherein said step of obtaining absolute shifts comprises:
   expressing said correlation peaks as a function of said look angles to obtain relative shifts;

subtracting a mean from said relative shifts; and
accumulating said relative shifts with said mean subtracted therefrom.

8. The method of claim 2, wherein said step of calculating a sway motion estimation comprises:
   calculating axial scene shifts based on said absolute shifts; and
   integrating and scaling said axial scene shifts to obtain a scalar function $A(\theta)$, wherein platform sway is proportional to said scalar function and wherein $\theta$ corresponds to an angle in spatial coordinates X and Y of said scene.

9. The method of claim 8, wherein said scalar function comprises an expression:

$$A(\theta_n) = C\left[\sum_{n=1}^{N}\frac{\sqrt{X_n^2+Y_n^2}*\cos\left(\theta_n+\arctan\left(\frac{Y_n}{X_n}\right)\right)}{N} + 2\sum_{i}^{n}\frac{\sqrt{X_n^2+Y_n^2}*\sin\left(\theta_n+\arctan\left(\frac{Y_n}{X_n}\right)\right)}{\csc\left(\frac{\Delta\theta}{2}\right)}\right],$$

wherein C is a constant.

10. The method of claim 8, wherein said step of generating a phase-correction matrix further comprises evaluating a polar phase function $S(|k|,\theta)=e^{j*A(\theta)|k|}$, wherein:
   $|k|$ is a Pythagorean sum of $k_x$ and $k_y$; and
   $k_x$ and $k_y$ are coordinates in said k-space.

11. The method of claim 10, wherein said step of applying said phase-correction matrix comprises:
   multiplying said k-space representation by a conjugate of said polar phase function to obtain said k-space representation of said focused image; and
   taking an inverse spatial Fourier transform of said k-space representation of said focused image.

12. A method of focusing a circular synthetic aperture sonar image of a scene taken from a platform, said method comprising the steps of:
   generating said sonar image using a phase-preserving method applied to raw echo data of said scene, said raw echo data having uncompensated motion errors;
   generating a k-space representation of said sonar image;
   generating reference sub-aperture images from a number, M, of evenly spaced look-angles over $2\pi$;
   generating relative sub-aperture images from a number, N, of evenly spaced look-angles, wherein N>>M;
   correlating a set of said relative sub-aperture images located between ± a span angle of a look angle corresponding to a particular one of said reference sub-aperture images with said particular one of said reference sub-aperture images;
   detecting correlation peaks based on said correlating;
   shifting said set of relative images based on said correlation peaks to form a semi-coherent image representing said scene from look-angles corresponding to ± said span angle, said semi-coherent image centered around said look angle corresponding to said particular one of said reference sub-aperture images;
   iteratively performing the steps of correlating, detecting and shifting for each of said reference sub-aperture images;
   determining a polynomial expression relating locations of said semi-coherent images with each other based on multiple-aperture map-drift methodology;
   based on said polynomial expression, positioning peak-shift measurements made between said relative sub-aperture images and said reference sub-aperture images to obtain absolute shifts;
   calculating a sway motion estimation of said platform based on said absolute shifts;
   generating a phase-correction matrix based on said sway motion estimation; and
   applying said phase-correction matrix to said sonar image to recover a focused image of said scene.

13. The method of claim 12, further comprising iteratively returning to generating reference sub-aperture images utilizing a k-space representation of said focused image.

14. The method of claim 12, wherein said step of calculating a sway motion estimation comprises:
   calculating axial scene shifts based on said absolute shifts; and
   integrating and scaling said axial scene shifts to obtain a scalar function $A(\theta)$, wherein platform sway is proportional to said scalar function and wherein $\theta$ corresponds to an angle in spatial coordinates X and Y of said scene.

15. The method of claim 14, wherein said scalar function comprises an expression:

$$A(\theta_n) = C\left[\sum_{n=1}^{N}\frac{\sqrt{X_n^2+Y_n^2}*\cos\left(\theta_n+\arctan\left(\frac{Y_n}{X_n}\right)\right)}{N} + 2\sum_{i}^{n}\frac{\sqrt{X_n^2+Y_n^2}*\sin\left(\theta_n+\arctan\left(\frac{Y_n}{X_n}\right)\right)}{\csc\left(\frac{\Delta\theta}{2}\right)}\right],$$

wherein C is a constant.

16. The method of claim 15, wherein said step of generating a phase-correction matrix further comprises evaluating a polar phase function $S(|k|,\theta)=e^{j*A(\theta)|k|}$, wherein:
   $|k|$ is a Pythagorean sum of $k_x$ and $k_y$; and
   $k_x$ and $k_y$ are coordinates in said k-space.

17. The method of claim 12, wherein said span angle is $\pi/M$.

18. The method of claim 12, wherein said span angle is greater than $\pi/M$, and wherein determining a polynomial expression further comprises:
   differentiating shift solutions for overlapping ones of said semi-coherent images to obtain differentiated shift solutions;
   averaging said differentiated shift solutions to obtain averaged shift solutions; and
   re-integrating said averaged shift solutions to form a continuous solution of semi-coherent images.

19. The method of claim 12, wherein said phase-preserving method comprises at least one of projection-slice imaging and time-delay and sum imaging.

20. The method of claim 2, wherein said step of detecting correlation peaks further comprises interpolating and filtering correlated sub-aperture images.

* * * * *